United States Patent
Akiyama (10) Patent No.: US 7,126,894 B2
(45) Date of Patent: Oct. 24, 2006

(54) OPTICAL DISK APPARATUS AND METHOD FOR ADJUSTING OPTICAL DISK APPARATUS LASER POWER

(75) Inventor: Jun Akiyama, Kashihara (JP)

(73) Assignee: Sharp Kabushiki Kaisha, Osaka (JP)

(*) Notice: Subject to any disclaimer, the term of this patent is extended or adjusted under 35 U.S.C. 154(b) by 423 days.

(21) Appl. No.: 10/029,363

(22) Filed: Dec. 20, 2001

(65) Prior Publication Data

US 2002/0080697 A1    Jun. 27, 2002

(30) Foreign Application Priority Data

Dec. 22, 2000   (JP)   ............. P2000-390155

(51) Int. Cl.
   *G11B 15/52*   (2006.01)
(52) U.S. Cl. ................... 369/47.5; 369/53.27
(58) Field of Classification Search ............. 369/47.5, 369/47.51, 47.52, 47.53, 53.12, 53.13, 53.14, 369/53.18, 53.19, 53.26, 53.27, 116
   See application file for complete search history.

(56) References Cited

U.S. PATENT DOCUMENTS

| | | | |
|---|---|---|---|
| 5,737,289 A | | 4/1998 | Udagawa |
| 6,067,284 A | * | 5/2000 | Ikeda et al. ................ 369/116 |
| 6,208,601 B1 | * | 3/2001 | Shimizu et al. .......... 369/53.19 |

FOREIGN PATENT DOCUMENTS

| | | |
|---|---|---|
| JP | 04-163745 | 6/1992 |
| JP | 6-44563 | 2/1994 |
| JP | 6-76290 | 3/1994 |
| JP | 8-129754 | 5/1996 |
| JP | 8-203079 | 8/1996 |
| JP | 9-17007 | 1/1997 |
| JP | 9-22530 | 1/1997 |
| JP | 9-171632 | 6/1997 |
| JP | 10-11755 | 1/1998 |
| JP | 11073700 | 3/1999 |

* cited by examiner

*Primary Examiner*—Paul W. Huber
(74) *Attorney, Agent, or Firm*—David G. Conlin; David A. Tucker; Edwards Angell Palmer & Dodge LLP (57) ABSTRACT

Provision of a displacement sensor, which detects an amount of shift at an objective lens, and a controller, which adjusts an emitted power based on a value measured by the displacement sensor and compensation data stored in a memory, permits detection by the displacement sensor of the amount of shift at the objective lens as necessary during recording of data, and the controller is capable of causing emission of an optimum emitted power from a laser source to an optical disk based on the measured value obtained and the compensation data. As a result, elimination of effects of fluctuation in effective power due to objective lens shift is permitted, and it is possible to ensure that the effective power of a laser irradiating the active layer will always be maintained at an optimum laser power.

9 Claims, 5 Drawing Sheets

OPTICAL DISK APPARATUS AND METHOD FOR ADJUSTING OPTICAL DISK APPARATUS LASER POWER

BACKGROUND OF THE INVENTION

1. Field of the Invention

The invention relates to an optical disk apparatus and a method for adjusting optical disk apparatus laser power, and relates in particular to an optical disk apparatus and a method for adjusting optical disk apparatus laser power, permitting compensation for factors causing fluctuation in effective power.

2. Description of the Related Art

In recent years, with the digitalization of video data, audio data, and various other types of data, there has been a dramatic increase in digital data volume. Accompanying this, development of optical disk apparatuses suited for high-capacity, high-density applications has proceeded apace. Along with progress in achieving increased density in optical disk apparatuses there has been decreased signal quality in the readout signal, and there have been a great many inventions proposing various methods for obtaining satisfactory signal quality. The factors affecting the signal quality of the readout signal include not only the conditions under which readout takes place and the method employed for carrying out readout, but also the conditions under which recording takes place and the method employed for carrying out recording. Among such recording conditions, the laser power employed at the time of recording will in particular have a large effect on signal quality, and an invention concerned with optimization of the laser power employed at the time of recording is disclosed at Japanese Unexamined Patent Publication JP-A 11-73700 (1999).

JP-A 11-73700 discloses a procedure for determining an optimum laser power to be employed during recording wherein laser power is varied while carrying out recording at the active layer of the disk and the signal recorded at the disk active layer is thereafter read, with optimum laser power during recording being the laser power producing the greatest amplitude ratio in the readout signal. The sequence of recording operations employed to obtain this optimum laser power for use during recording is called a test write. By carrying out such a test write, it is possible to compensate for such factors as variation in laser power due to apparatus and disk characteristics as well as fluctuation in laser power due to changes in ambient temperature, employment of such an optimized laser power allowing an optical disk apparatus to record data with satisfactory signal quality.

In an optical disk apparatus it is possible for the laser power arriving at the disk active layer, i.e., the "effective power," to fluctuate despite emission of constant laser power from the laser source, and this will tend to cause the optimum laser power to fluctuate as well. As a result, even for the same apparatus-disk combination and even where temperature is held constant, optimum laser power will in general in such a case be nonconstant due to varying conditions at the apparatus, resulting in the problem that it is difficult to cause the laser to irradiate the disk active layer with optimum laser power.

Included among the factors contributing to fluctuation in effective power are objective lens shift, tilt, and servo residual error, and the like. In particular, the effect of shift at the objective lens used in the optical head, i.e., displacement of the center of that objective lens relative to the optical axis of the laser, is large, such objective lens shift being capable of causing fluctuation in the optimum laser power during recording of as much as several percent.

The reason that objective lens shift causes fluctuation in effective power is that objective lens shift causes a change in the fraction of the laser light emitted from the laser source which is incident at the objective lens. Accordingly, despite use of APC (Automatic Power Control) to maintain a constant laser power emitted from the laser source, the laser power exiting the objective lens will nonetheless fluctuate, making it impossible to irradiate the disk active layer with constant effective power.

Figure 6:
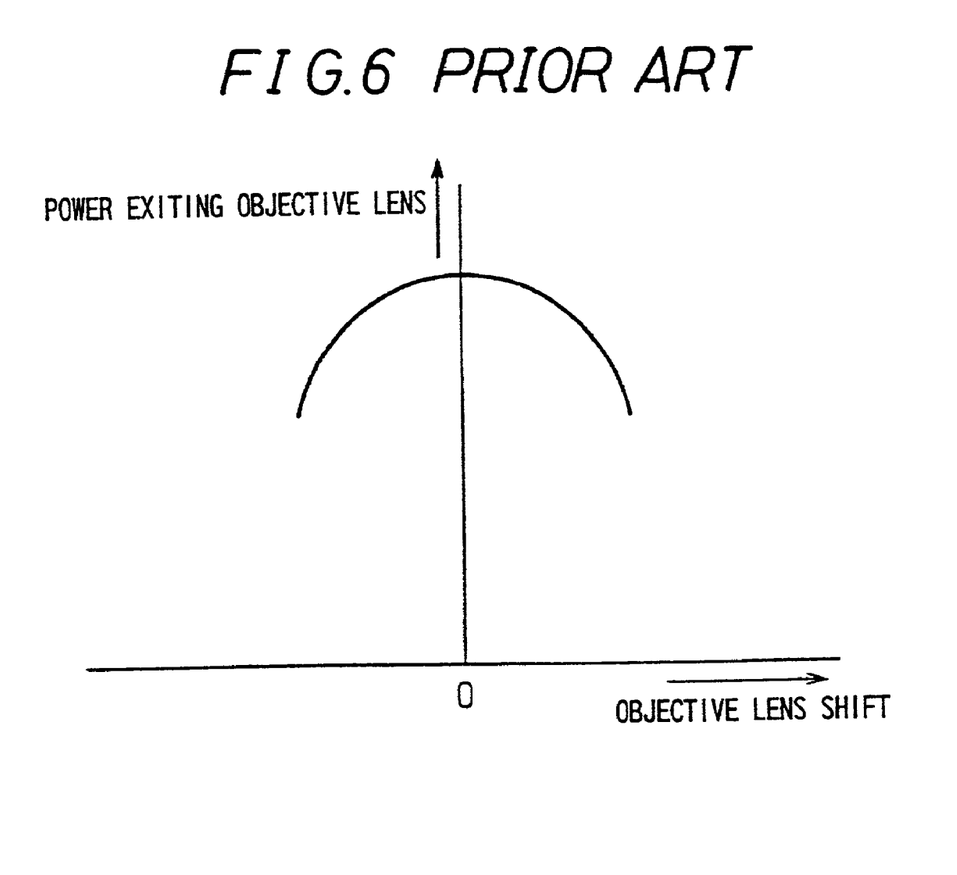
FIG. 6 is a graph showing the laser power exiting an objective lens as the objective lens is shifted.

FIG. 6 is a graph showing laser power exiting an objective lens as a function of shift at the objective lens, the horizontal axis indicating the amount of shift at the objective lens and the vertical axis indicating the laser power exiting the objective lens. Holding laser power emitted from the laser source constant and varying the amount of shift at the objective lens, the laser power exiting the objective lens is a maximum for zero shift at the objective lens, i.e., when the center of the objective lens coincides with the optical axis of the laser. Furthermore, the laser power exiting the objective lens decreases with increasing shift at the objective lens; that is, as the objective lens is displaced in either a positive or a negative direction from the zero-shift arrangement.

Because optical head assembly tolerances cannot be completely eliminated, there will in general be a nonzero shift at the objective lens, i.e., the objective lens will be displaced in either a positive or a negative direction relative to the laser optical axis, when the objective lens is in its neutral state, i.e., at a time when it is not acted upon at all by the objective lens actuator. Moreover, during tracking servo operations, because the position of the objective lens is controlled so as to cause the beam spot to follow any eccentricity in the disk, the objective lens will furthermore be shifted in either a positive or a negative direction from its neutral position by an amount corresponding to such eccentricity. Another cause of objective lens shift is lag in tracking during seek servo operations for moving the optical head in the radial direction of the disk. For these and other reasons, occurrence of objective lens shift is unavoidable.

As described above, a change in objective lens shift will cause a change in the laser power exiting the objective lens, and the amount of objective lens shift at the time that the above-described test write is carried out may be different from the amount of objective lens shift at the time that a user carries out recording or readout. That is, there is an error component due to fluctuation in laser power caused by objective lens shift which is in general present despite the fact that the laser power exiting the laser source at the time of recording is an optimum laser power as determined by carrying out a test write.

Accordingly, as conventional optical disk apparatuses do not permit compensation for variation in optimum laser power due to changes in objective lens shift and other such factors causing fluctuation in effective power, there is the problem that recording is carried out at a laser power other than the optimum laser power at the time of recording, causing decrease in readout signal quality.

SUMMARY OF THE INVENTION

It is therefore an object of the invention to provide an optical disk apparatus and a laser power adjustment method thereof permitting recording to be carried out such that an optimum laser power is always delivered despite fluctuations in laser power due to factors affecting effective power, as a result of adjustment of laser power in accompaniment to changes in such factors.

The invention provides an optical disk apparatus in which an active layer of an optical disk is irradiated with a laser, comprising:

detection means for detecting an amount of change in a factor causing fluctuation in effective power, the effective power being the laser power at the active layer of the optical disk;

storage means for storing compensation data indicating a relationship between an amount of change in the factor causing fluctuation in effective power and an optimum emitted power corresponding to the amount of that change; and control means for adjusting emitted power based on the compensation data and a value detected by the detection means.

According to the invention, detection means permits detection of an amount of change in a factor causing fluctuation in effective power as necessary during recording or readout. Furthermore, control means makes it possible to cause a laser to be emitted from a laser source such that it has an optimum emitted power based on the amount of the change obtained and based on compensation data stored at storage means. This makes it possible to eliminate the effects of factors causing fluctuation in effective power and ensure that the effective power of a laser irradiating an active layer will always be maintained at an optimum laser power.

Furthermore, in accordance with the invention, it is possible to ensure that the effective power of a laser irradiating an active layer of an optical disk will always be maintained at an optimum laser power despite variation in a factor causing fluctuation in effective power. By thus irradiating the active layer of the optical disk with an optimum laser power, it is possible to obtain satisfactory signal quality during readout and increase the density with which signals are recorded at the active layer of the optical disk.

Furthermore, in the invention it is preferable that acquisition means is provided for acquiring, from an optical disk on which recording is to be carried out, a compensation correction value for correcting the compensation data;

the control means carrying out adjustment of emitted power based on the detected value, the compensation data, and the compensation correction value.

In accordance with the invention, because acquisition means makes it possible to obtain a compensation correction value for correction of compensation data separately for each optical disk, it is possible to obtain an optimum effective power when there is a change in a factor causing fluctuation in effective power separately for each recording medium. Accordingly, it is possible to ensure that the effective power of a laser irradiating an active layer will always be maintained at an optimum laser power even when the amount of the change in the factor causing fluctuation in effective power is different for different recording media.

Furthermore, in accordance with the invention, because it is possible to, separately for each optical disk, ensure that the effective power will always be maintained at an optimum laser power, it is possible to, separately for each optical disk, eliminate the effects of fluctuation in effective power, obtain a still more satisfactory signal quality during readout, and achieve more definitive increase in the density with which signals are recorded at the active layer of the optical disk.

Furthermore, in the invention it is preferable that the detection means detects an amount of shift, in an optical disk radial direction, of an objective lens that focuses a laser on an active layer of the optical disk.

In accordance with the invention, because detection means permits detection of an amount of shift of an objective lens, it is possible to eliminate the effects of shift at the objective lens, such objective lens shift representing the most significant of the factors causing fluctuation in effective power.

Furthermore, in accordance with the invention, because detection means permits detection of an amount of shift of an objective lens, it is possible to eliminate the effects of shift at the objective lens, such objective lens shift representing the most significant of the factors causing fluctuation in effective power, and it is possible to obtain an optimum laser power with good effect. This optimum laser power permits alteration in the active layer such that an active layer is formed which will allow a satisfactory signal quality to be obtained.

Furthermore, in the invention it is preferable that the compensation data is set separately for each individual optical disk apparatus.

In accordance with the invention, because laser compensation data is set separately for each individual apparatus, it is possible to eliminate the effects of variation in laser power and of variation in detection separately for each apparatus.

Furthermore, in accordance with the invention, because compensation data is set separately for each individual apparatus, it is possible to, separately for each optical disk apparatus, eliminate the effects of variation in laser power and of variation in detection, obtain a still more satisfactory signal quality during readout, and achieve still more definitive increase in the density with which signals are recorded at the active layer.

Furthermore, the invention provides a method for adjusting laser power in an optical disk apparatus in which an active layer of an optical disk is irradiated with a laser, the method comprising:

a first step of acquiring and storing at storage means compensation data indicating a relationship between an amount of a change in a factor causing fluctuation in an effective laser power which is the laser power at the active layer of the optical disk, and an optimum emitted power corresponding to the amount of the change;

a second step of detecting from an optical disk on which recording is to be carried out an amount of a change in a factor causing fluctuation in effective power and obtaining compensation correction values for correcting the compensation data; and a third step of detecting an amount of a change in a factor causing fluctuation in effective power during recording and adjusting emitted power based on this detected value, the compensation data, and the compensation correction values.

In accordance with the invention, it is possible to obtain compensation data and a compensation correction value prior to recording or readout, and it is possible to obtain an optimum emitted power when there is a change in a factor causing fluctuation in effective power during recording. As a result, measurement of an amount of change in a factor causing fluctuation in effective power as necessary during recording or readout permits emitted power to be adjusted at each change in a factor causing fluctuation in effective power, permits elimination of effects of a factor causing fluctuation in effective power, and makes it possible to ensure that the effective power of a laser irradiating an active layer of an optical disk will always be maintained at an optimum laser power.

Furthermore, in accordance with the invention, measurement of an amount of a change in a factor causing fluctuation in effective power as necessary during recording or readout permits optimum emitted power to be controlled at each occurrence of a change in a factor causing fluctuation in effective power, permits elimination of effects of factors causing fluctuation in effective laser power, and makes it possible to ensure that the effective power of a laser irradiating an active layer will always be maintained at an optimum laser power. As a result, it is possible to obtain satisfactory signal quality during readout and achieve increases in the density with which signals are recorded at an active layer.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENT

Now referring to the drawings, preferred embodiments of the invention are described below.

Figure 1:
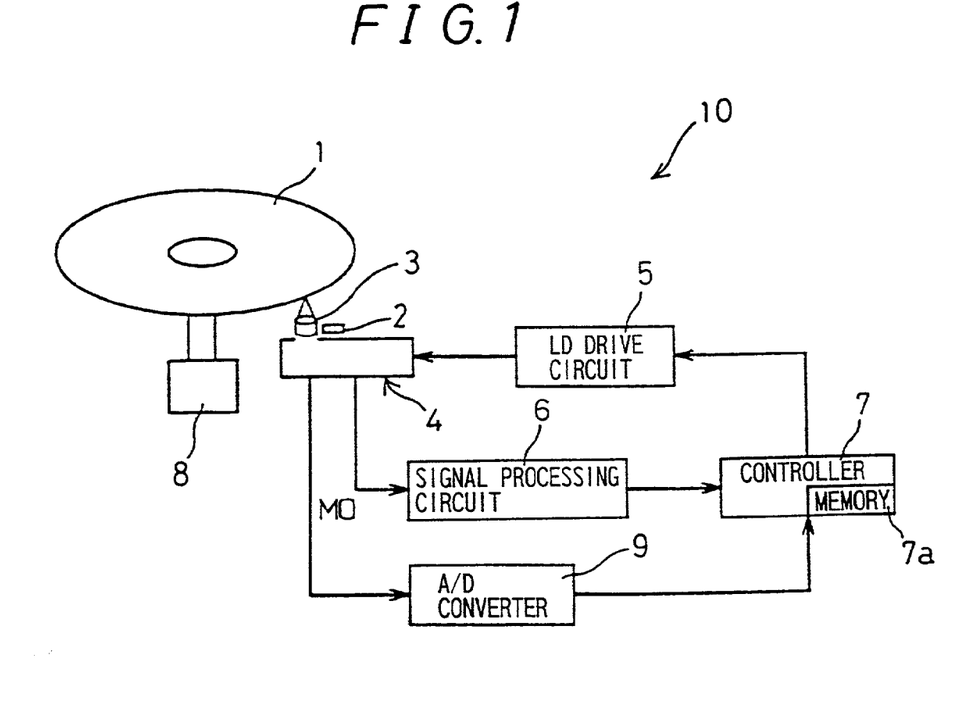
FIG. 1 is a block diagram showing the principal components of an optical disk apparatus 10 in one embodiment of the invention.

FIG. 1 is a block diagram showing the principal components of an optical disk apparatus 10 in one embodiment of the invention. The optical disk apparatus 10 is capable of causing recording to and readout from an optical disk, and the present embodiment is described in terms of an optical disk apparatus employing magneto-optical recording.

The optical disk apparatus 10 irradiates the active layer of an optical disk 1 with a laser emitted from a laser source internal to a head 4, and light reflected from the active layer of the optical disk 1 is incident on a photodetector of the head 4, where it is converted to a data signal, permitting readout of data recorded on the optical disk 1. Furthermore, by adjusting the power of the laser irradiating the active layer of the optical disk 1 it is possible to alter the state of the active layer at the optical disk 1, permitting data to be recorded at the active layer of the optical disk 1.

The optical disk apparatus 10 comprises a spindle motor 8 capable of causing the optical disk 1 to rotate, a head 4 having a mechanism for irradiating the optical disk 1 with a laser and for receiving laser light reflected therefrom, a signal processing circuit 6 capable of carrying out signal processing with respect to reflected laser light received by the head 4, an LD drive circuit 5 capable of adjusting the power of the laser emitted from a laser source, a displacement sensor 2 serving as detection means for detecting the amount of shift at an objective lens 3, and a controller 7 serving as control means for controlling the various components. Furthermore, internal to the controller 7 is a memory 7a serving as storage means for storing compensation data.

In the present embodiment, the power of the laser light irradiating the disk active layer is taken to be the effective power, and the power of the laser light emitted from the laser source is taken to be the emitted power. Furthermore, for convenience of description the present embodiment assumes that there is only a single factor causing fluctuation in effective power, this being the amount by which an objective lens is shifted in the radial direction of the disk. Furthermore, optimum laser power is the laser power which allows the most satisfactory data signal to be obtained during readout of a data signal recorded at the disk active layer.

The optical disk 1 is mounted on a shaft of the spindle motor 8, rotation of the spindle motor 8 causing rotation of the optical disk 1. A head 4 is formed at a location facing the active layer of the optical disk 1, the head 4 being provided with a laser source, an objective lens 3, and a photodetector, and being capable of carrying out tracking servo and seek servo operations. Laser light is emitted from the laser source, is focused as a result of passing through the objective lens 3, and irradiates a laser-irradiated region at the active layer. The intensity of the laser light at this time is different depending on whether recording or readout is being carried out, control being carried out by the LD drive circuit 5 so as to attain an appropriate laser intensity.

During recording, a change in the effective power with which the active layer of the optical disk is irradiated will cause occurrence of a change in the magnetic field at the laser-irradiated region of the active layer. As a result, it is possible to sequentially form a magnetic field in binary fashion at the active layer. During readout, the resulting differences in the magnetic field at the active layer can be detected by a photodetector, allowing a binary signal to be read therefrom.

After the reflected light is detected by the photodetector, the signal therefrom is split into various signals including a magneto-optical signal (hereinafter "MO signal"), an address signal, and a servo signal. The amplitude and offset of the MO signal are adjusted by the signal processing circuit 6, the resulting signal is converted into digital data, and this is furthermore demodulated. The demodulated data is supplied to an error correction circuit, not shown. Moreover, control information present within the MO signal is sent to the controller 7.

An objective lens shift signal indicating the amount of shift at the objective lens is converted to digital data by an A/D converter 9, and this is thereafter sent to the controller 7. This objective lens shift signal is obtained as a result of detection of the displacement of the objective lens 3 by the displacement sensor 2 incorporated within the head 4. Possible detection methods for use at the displacement sensor 2 include optical detection and electrocapacitative detection, and a suitable sensor should be selected based on applicable dimensions, required precision, and so forth.

Furthermore, it is also possible to employ a method wherein objective lens shift is detected from the drive current at the objective lens actuator. This method, in which displacement is detected through exploitation of a proportional relationship between drive current and displacement of the objective lens 3, has the advantage that it permits inexpensive detection of the amount of shift at the objective lens 3 because there is no need for a displacement sensor 2. However, with such a method, where a force acts on the objective lens 3 other than that which is exerted by the actuator, the error will be large. For example, depending on the orientation in which the apparatus is installed, the force of gravity may have a component in the tracking direction of the objective lens 3, in which case there would be an error corresponding to the displacement of the objective lens due to gravity.

Below, a procedure for adjusting laser power during recording is described.

Taking the power of the laser light emitted from the laser source during recording to be the recording power, a procedure for controlling the recording power possesses three major steps. In accordance with this procedure, in a first step, an optical disk apparatus first captures compensation data for compensation of recording power. This happens prior to recording operations, taking place for example at the time of shipment of the apparatus using a test disk or the like. Next, in a second step, prior to recording of data, compensation correction values for correcting the compensation data are acquired separately for each optical disk on which actual data is to be recorded. Lastly, in a third step, during recording of data, laser power is adjusted so as to attain an optimum recording power as appropriate for the applicable amount of objective lens shift.

These respective steps are now described in further detail.

Figure 2:
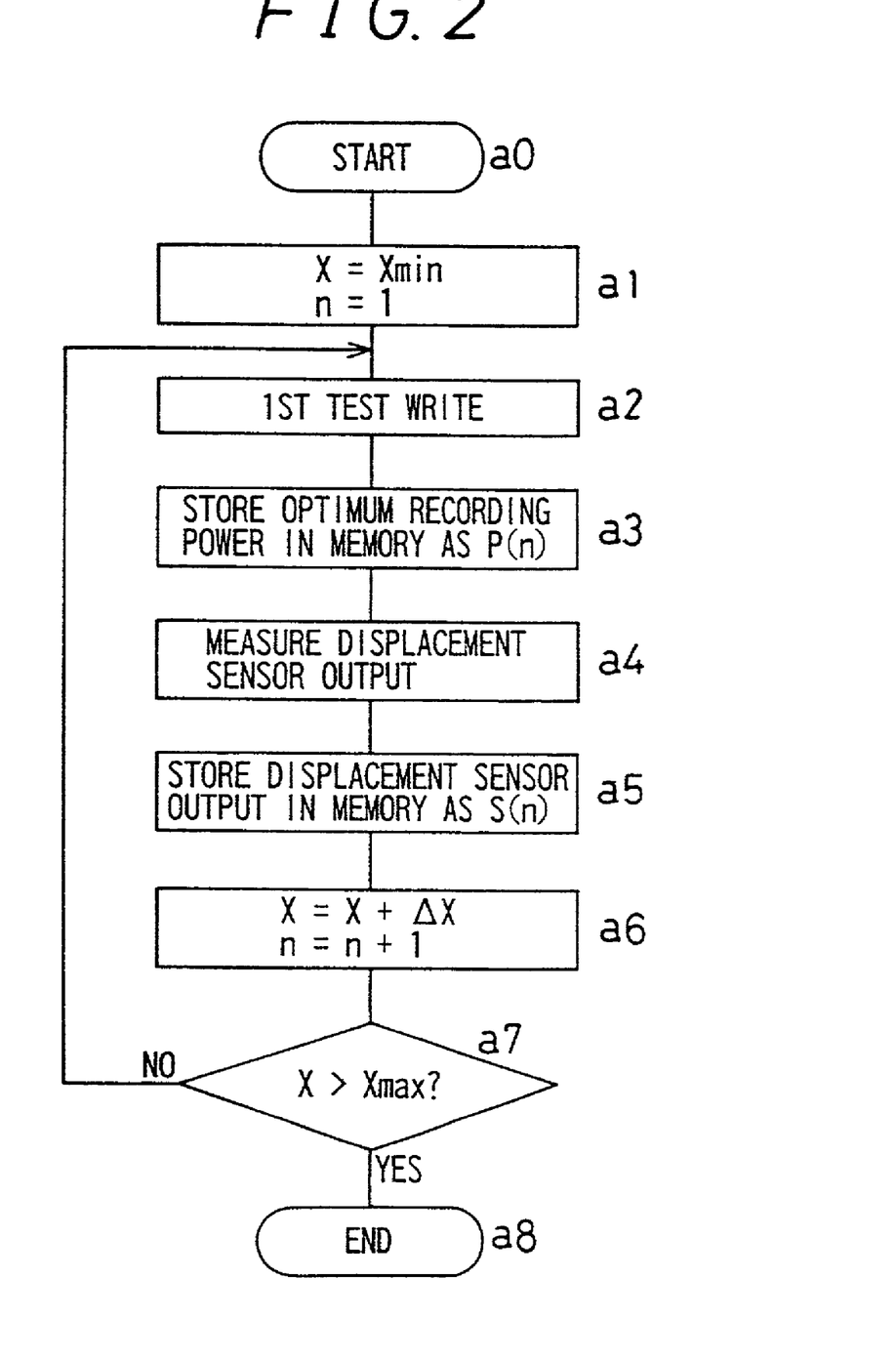
FIG. 2 is a flowchart showing a procedure for acquiring compensation data.

FIG. 2 is a flowchart showing a procedure for acquiring compensation data. Acquisition of compensation data is carried out to learn the relationship between objective lens shift and optimum recording power. Because the amount of shift at the objective lens when in the neutral state will vary from apparatus to apparatus, it is preferred that this operation be carried out separately for each apparatus. Furthermore, because differences in disk characteristics and effects due to changes in ambient conditions are small, it is sufficient to carry out this operation once at the time of shipment and store the results thereof in, for example, a nonvolatile memory 7a internal to the controller 7. Calibration operations may be carried out periodically if necessary.

The optical disk apparatus possesses acquisition means for acquiring compensation data, this acquisition means comprising the LD drive circuit 5, the head 4, the controller 7, and so forth, and permitting recording of data while altering laser power in sequential fashion and detection of signal quality of the data signal during readout.

Furthermore, where acquisition of compensation data is carried out at the time of shipment, it is desirable that the test disk used be selected so as to have little eccentricity in order to reduce the objective lens shift component due to the disk. Moreover, so as to reduce the influence of factors other than objective lens shift, e.g., disk tilt, it is desirable to use a test disk having little tilt, and to perform the test write at a region toward the center of the disk, where tilt is small.

Acquisition of compensation data is such that first, at step a0, preparatory operations are carried out, such as mounting of a test disk having small error as described above on the spindle motor shaft, following which, after such preparatory operations have been completed, acquisition of compensation data begins, with processing proceeding to step a1. At step a1, the objective lens is moved (in the negative direction at FIG. 6) to a position corresponding to an objective lens shift X of Xmin, Xmin being a predetermined minimum amount, and the value of an index n of a pair of memory arrays, described below, is set to 1.

In specific terms, positioning of the objective lens so as to have an objective lens shift X may take place by jumping tracks in, for example, the negative direction while the seek control loop is held open. In still more specific terms, the objective lens may be moved to a position corresponding to a prescribed amount of shift by jumping tracks in, for example, the negative direction while the seek control loop is held open. For example, taking the case where track pitch is 1.6 μm, a shift of 100 μm might be achieved by jumping over 100/1.6≈63 tracks in, for example, the negative direction. After thus setting the objective lens shift X to the predetermined minimum amount Xmin, processing proceeds to the first test write of step a2.

At step a2, holding the objective lens shift X constant, recording of test data is carried out while varying the effective power in sequential fashion, following which the recorded test data is read. At this time, the various values of effective power employed and the various signal qualities obtained are stored at the memory 7a in linked fashion, the effective power producing the best signal quality is retrieved from the memory 7a, and this value is determined to be the optimum recording power. Following determination of optimum recording power, processing proceeds to step a3.

At step a3, the value for optimum recording power when objective lens shift is X, which was obtained from the first test write, is stored at a memory array address P(n), and processing proceeds to step a4. At step a4, the output of the displacement sensor 2 when objective lens shift is X is measured. At step a5, the value of the output from the displacement sensor 2 so obtained is stored at a memory array address S(n). As a result, the amount of shift attained as a result of jumping tracks will be stored at the memory array S(n) in the form of an amount of displacement of the objective lens 3 in the radial direction of the disk. This memory array address P(n) and this memory array address S(n) are regions within the nonvolatile memory 7a internal to the controller 7. After recording, processing proceeds to step a6.

At step a6, objective lens shift X is incremented by a small amount ΔX (e.g., the width of 1 track) and the value of the index n of the memory arrays is incremented by 1, following which processing proceeds to step a7. At step a7, determination is made as to whether the newly incremented objective lens shift X exceeds a predetermined maximum amount Xmax, and if it does not then processing returns to step a2, where an optimum recording power value for the incremented objective lens shift X is stored in memory in sequential fashion with respect to any values previously stored there. Processing thus loops from step a2 to a6 until the objective lens shift X exceeds a predetermined maximum amount Xmax, upon which the value at index n=max and processing proceeds to step a8, with processing for acquisition of compensation data ending at step a8.

A relationship indicating an optimum recording power for each displacement sensor 2 output can thus be obtained, and optimum recording powers P (1) through P (max) corresponding to objective lens shifts S (1) through S (max) can be stored within the memory at the controller 7. Furthermore, compensation data may be obtained separately for each individual apparatus by carrying out determination of a relationship between displacement sensor 2 output and optimum recording power separately for each apparatus. Furthermore, instead of obtaining compensation data separately for each individual apparatus, it is also possible to use a standard relationship between displacement sensor 2 output and optimum recording power for the compensation data, in which case the foregoing procedure may be omitted.

However, the sensitivity of the displacement sensor 2 will vary from apparatus to apparatus, and the power settings at the controller 7 and the laser power which is actually emitted will likewise vary from apparatus to apparatus. Acquisition for each apparatus of an output from the displacement sensor 2 which is provided at that apparatus and of an optimum recording power as produced by that apparatus and storage of both of these values as described above therefore has the advantage that it permits elimination of the effects of such variations among apparatuses.

Processing occurring during recording is next described. First, prior to recording data on an optical disk, a second test write is carried out, compensation correction values are acquired, and an optimum recording power is set based on the compensation data, compensation correction values, and objective lens shift.

Figure 3:
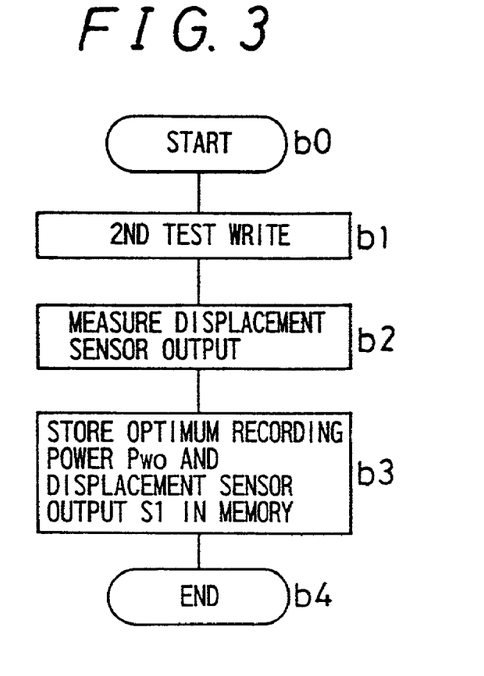
FIG. 3 is a flowchart showing a procedure for acquiring a compensation correction value for an optical disk prior to recording.

FIG. 3 is a flowchart showing a procedure for acquiring compensation correction values for an optical disk prior to recording. Acquisition of compensation correction values for an optical disk prior to recording is such that first, at step b0, preparatory operations are carried out, such as mounting of an optical disk on which recording is to be carried out on the spindle motor shaft, following which, after such preparatory operations have been completed, processing proceeds to step b1.

At step b1, a second test write is carried out at a single test write region (track) in more or less the same way as was described above with reference to step a2. The region at which the second test write is carried out need not be a dedicated test write region but may comprise regions also used for recording of data by the user. However, where this is the case, the average size of the unrecorded regions available for test write use will grow smaller as the user records more and more data, meaning that more time will be required to find or assemble a test write region of suitable size. It is therefore desirable that a dedicated test write region be provided. Where a dedicated test write region is provided, the test write is carried out at a region different from the region on the disk at which user data is recorded. Following completion of the second test write which is carried out as described above and detection of an optimum recording power Pwo when at the test write region, processing proceeding to step b2.

At step b2, in order to know the amount of shift of the objective lens when at the test write region (track) where the second test write was carried out, the output S1 of the displacement sensor 2 is measured at the test write region, following which processing proceeds to step b3. At step b3, compensation correction values are stored in the memory 7a, these compensation correction values being the displacement sensor output S1 and the optimum recording power Pwo obtained as a result of the second test write, following which processing proceeds to step b4, with processing for acquisition of compensation correction values for an optical disk prior to recording ending at step b4.

The foregoing procedure for acquiring compensation correction values makes it possible to obtain compensation correction values, i.e., an optimum recording power Pwo at a given objective lens shift S1, for an optical disk on which data is to be recorded. This acquisition procedure is such that acquisition of compensation correction values may be carried out in more or less the same fashion as was the case for acquisition of compensation data by the acquisition means described above, without the need to provide new components specifically for acquisition of compensation correction values.

Figure 4:
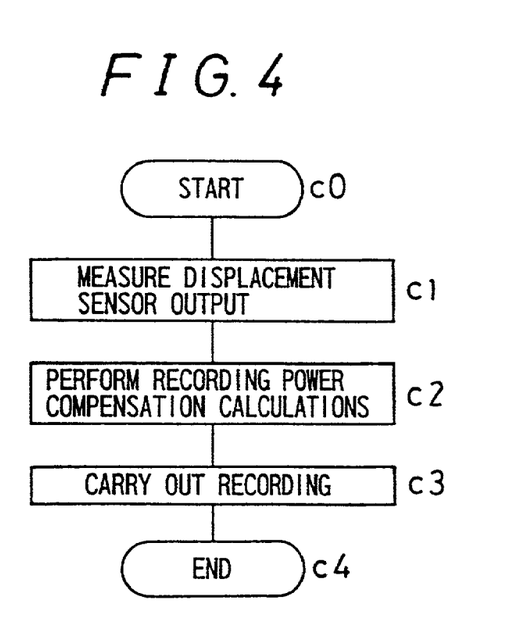
FIG. 4 is a flowchart showing processing occurring when carrying out recording at a disk.

FIG. 4 is a flowchart showing processing occurring when carrying out recording at a disk. Processing during recording of data is such that first, at step c0, processing to be carried out during recording begins only after completion of operations for acquisition of compensation correction values as described with reference to steps b0 through b4, upon completion of which processing proceeds to step c1. First, at step c1, the output S2 of the displacement sensor 2, i.e., the amount of shift at the objective lens, when at the track where recording is to be carried out is detected, following which processing proceeds to step c2.

At step c2, the controller 7 carries out calculations for compensation to attain an optimum recording power based on the compensation data, compensation correction values, and the output of the displacement sensor when at the track where recording is to be carried out, and upon completion of those calculations processing proceeds to step c3. At step c3, the controller 7 sends a signal to the LD drive circuit 5 so as to cause output of the optimum recording power so obtained, causing adjustment of the laser so as to produce that optimum recording power. Recording of data takes place at the active layer of the optical disk at this recording power, following which processing proceeds to step c4, with processing during recording ending at step c4. By carrying out the processing during recording described with reference to these steps c1 through c4 as necessary, it is possible to always carry out recording with an optimum recording power output.

The calculations for compensation of recording power at step c2 are carried out based on the optimum recording power Pwo stored at step b3, above, with compensation for the appropriate amount of objective lens shift. That is, because the same disk is used at the time of the second test write (step b1) and at the time that data is recorded but the shift at the objective lens will in general be different, calculations are carried out to correct for this fact.

Figure 5A:
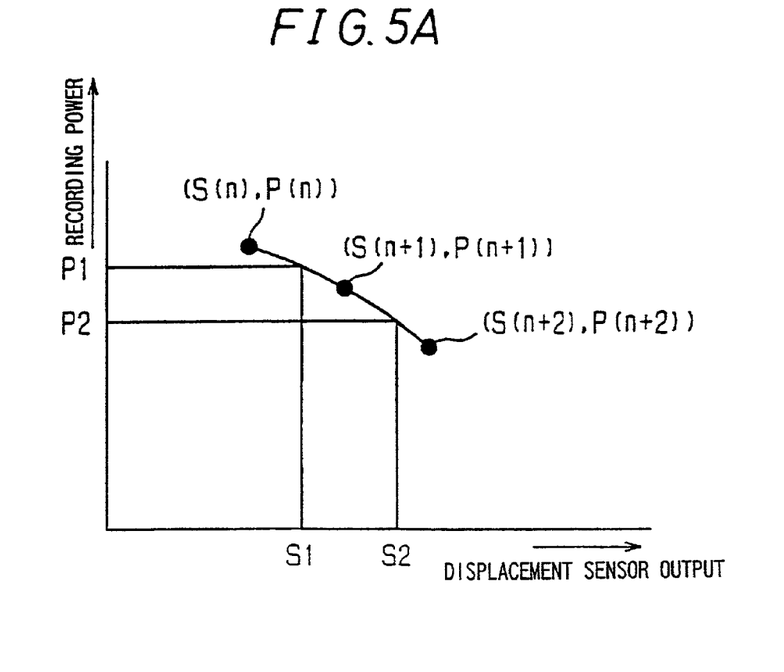
FIGS. 5A and 5B are graphs showing optimum recording power.

Calculations for compensation of recording power are described in detail with reference to FIGS. 5A and 5B. FIG. 5A is a graph showing compensation data obtained as a result of compensation data acquisition processing. The horizontal axis indicates displacement sensor output, i.e., the amount of shift at the objective lens, and the vertical axis indicates recording power. The black dots indicate actual compensation data measurements, not all of such data being shown at FIGS. 5A and 5B but only the coordinates at three such points $(S(n),P(n))$, $(S(n+1),P(n+1))$, $(S(n+2),P(n+2))$ necessary for description of compensation calculations. These points can be thought of as lying on an imaginary interpolated line having a slope such that the horizontal axis coordinate decreases as the vertical axis coordinate is increased.

Here, the displacement sensor output S1 obtained as a result of the second test write lies between Sn and $S(n+1)$, and an arbitrary displacement sensor output S2 existing during recording of data lies between $S(n+1)$ and $S(n+2)$.

First, two recording powers P1, P2 for the two displacement sensor outputs S1, S2 are obtained directly by interpolation from the compensation data $(S(n),P(n))$, $(S(n+1),P(n+1))$, $(S(n+2),P(n+2))$. These two recording powers P1, P2 represent optimum recording powers P1, P2 for the respective displacement sensor outputs S1, S2 for the test disk, and are different from the optimum recording power P for the optical disk to be used during recording.

Figure 5B:
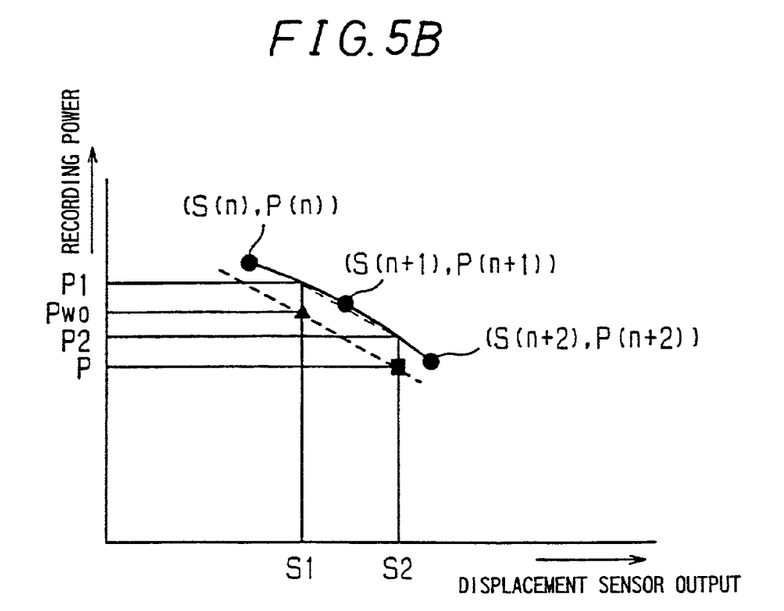

Furthermore, in the example shown in FIGS. 5A and 5B, because the optimum recording powers obtained from the compensation data are such that P2 is less than P1, P2/P1 will be less than 1, and it can be seen from the compensation data that the recording power P for displacement sensor output S2 during recording must be made smaller by a factor P2/P1 than the optimum recording power Pwo for the displacement sensor output S1 during the second test write, this pair of values representing the compensation correction values.

Accordingly, by multiplying the optimum recording power Pwo for the displacement sensor output S1 obtained at the second test write by a compensation factor equal to P2/P1, it is possible to obtain an optimum recording power P at the time of an arbitrary displacement sensor output S2 during recording. That is, the optimum recording power P for an arbitrary displacement sensor output S2 is given by FORMULA (1).

$$P = Pwo \times P2/P1 \quad (1)$$

At FIG. 5B, the optimum recording power Pwo for the displacement sensor output S1 obtained at the second test write is indicated by a black triangle, and the optimum recording power P at the time of an arbitrary displacement sensor output S2 during recording is indicated by a black square.

As described above, because the present embodiment permits compensation of recording power in correspondence to the amount of objective lens shift based on previously acquired compensation data and compensation correction values, it is possible to eliminate the effects of factors arising due to objective lens shift which cause fluctuation in effective power.

Furthermore, where the optimum recording power P1 for respective displacement sensor outputs S1 for the test disk and the optimum recording power Pwo for an optical disk to be used during recording are more or less the same, the foregoing acquisition processing wherein compensation correction values are detected may be omitted and the recording power P for the optical disk may be adjusted based on the optimum recording power P2 obtained from the compensation data in correspondence to the objective lens shift S2.

Moreover, whereas in the foregoing embodiment the calculations for compensation of recording power and the like were described in terms of processing implemented in software, processing for the calculations for compensation may also be implemented in hardware. By so doing, it is possible to carry out processing faster than would be the case were processing implemented in software, as a result of which the apparatus may be constructed so as to ensure that optimum recording power is always maintained despite changes in objective lens shift occurring at even higher frequencies than would be the case were processing implemented in software.

Furthermore, whereas the present embodiment was described in terms of objective lens shift, thought to be the most significant of the factors causing fluctuation in effective power, the invention may also be applied to tilt and servo residual error, these representing other factors causing fluctuation in effective power; for example, where the invention is to be applied to elimination of the effects of tilt, this can be achieved by replacing the displacement sensor of the present embodiment with a sensor capable of detecting the amount of tilt.

Furthermore, whereas the invention was described in terms of the magneto-optical recording method, the invention may be applied wherever an optical disk is recorded or read through use of a laser; for example, the invention may be applied in similar manner to the phase-change recording method and so forth. Furthermore, laser power may be adjusted for readout operations in the same manner in which it has been described for recording operations.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical disk apparatus in which an active layer of an optical disk is irradiated with a laser and the optical disk apparatus and the optical disk are maintained at substantially the same temperature, comprising:

detection means for detecting an amount of shift, in an optical disk radial direction, of an objective lens that focuses said laser on said active layer of said optical disk causing fluctuation in effective power, the effective power being the laser power at the active layer of the optical disk;

storage means for storing compensation data indicating a relationship between an amount of change in the factor causing fluctuation in effective power and an optimum emitted power corresponding to the amount of that change; and control means for adjusting emitted power based on the compensation data and a value detected by the detection means.

2. The optical disk apparatus of claim 1, further comprising:

acquisition means for acquiring, from an optical disk on which recording is to be carried out, compensation correction values for correcting the compensation data, wherein the control means adjusts emitted power based on the detected value, the compensation data, and the compensation correction values.

3. The optical disk apparatus of claim 1, wherein the compensation data is set separately for each individual optical disk apparatus.

4. The optical disk apparatus of claim 2, wherein the compensation data is set separately for each individual optical disk apparatus.

5. A method for adjusting laser power in an optical disk apparatus in which an active layer of an optical disk is irradiated with a laser and the optical disk apparatus and the optical disk are maintained at substantially the same temperature, the method comprising:

a first step of acquiring and storing at storage means compensation data indicating a relationship between an amount of shift, in an optical disk radial direction, of an objective lens that focuses said laser on an active layer of said optical disk causing fluctuation in an effective laser power which is the laser power at the active layer of the optical disk, and an optimum emitted power corresponding to the amount of the change;

a second step of detecting from an optical disk on which recording is to be carried out an amount of said objective lens shift causing fluctuation in effective power and obtaining a compensation correction value for correcting the compensation data; and a third step of detecting an amount of said objective lens shift causing fluctuation in effective power during recording and adjusting emitted power based on this detected value, the compensation data, and the compensation correction value.

6. An optical disk apparatus in which an active layer of an optical disk is irradiated with a laser, comprising:

detection means for detecting an amount of change in an objective lens shift focusing said laser onto the active layer of the optical disk, or of a servo residual error, causing fluctuations in effective laser power at the active layer of the optical disk;

storage means for storing compensation data indicating a relationship between said amount of said objective lens shift or of said servo residual error and an optimum emitted laser power corresponding to the amount of said change; and control means for adjusting emitted laser power based on said compensation data and a value respectively detected by the detection means.

7. An optical disk apparatus in which an active layer of an optical disk is irradiated with a laser, comprising:

detection means for detecting an amount of change in a factor causing fluctuation in effective power, the effective power being the laser power at the active layer of the optical disk;

storage means for storing compensation data indicating a relationship between an amount of change in the factor causing fluctuation in effective power and an optimum emitted power corresponding to the amount of the change, the compensation data being obtained by changing a factor causing fluctuation in effective power with respect to an optical disk for testing, and sequentially changing emitted power of the laser emitted from a laser source according to each factor causing fluctuation; and control means for adjusting emitted power based on the compensation data and a value detected by the detection means with respect to an optical disk to which data is recorded or from which data is reproduced, and acquisition means for acquiring the compensation data by changing a factor causing fluctuation in effective power with respect to the optical disk for testing, and sequentially changing the emitted power of the laser emitted from the laser source according to each change of the factor causing fluctuation, wherein the acquisition means further acquires a compensation correction value for correcting the compensation data from the optical disk to which data is recorded or from which data is reproduced, and the control means adjusts, at the time of recording or reproduction, emitted power based on the detection value of the detection means, the compensation data and the compensation correction value, wherein the acquisition means obtains an optimum emitted power Pwo by sequentially changing emitted power with respect to the optical disk to which data is recorded or from which data is reproduced, and acquires as a compensation correction value the obtained optimum emitted power Pwo and an amount of change S1 in a factor causing fluctuation in effective power with respect to the optimum emitted power Pwo, and wherein:

when the optimum emitted power Pwo acquired as a compensation correction value is referred to as Pwo, an optimum emitted power P1 which is obtained based on the correction data and corresponds to the amount of change S1 in a factor causing fluctuation in effective power is referred to as P1, and an optimum emitted power P2 which is obtained based on the correction data and corresponds to the amount of change S2 in a factor causing fluctuation detected from the detection means is referred to as P2, then the control means adjusts the emitted power P at a time of recording or reproduction so as to be Pwo×P2/P1.

8. An optical disk apparatus in which an active layer of an optical disk is irradiated with a laser, comprising:

detection means for detecting an amount of change in a factor causing fluctuation in effective power, the effective power being the laser power at the active layer of the optical disk;

storage means for storing compensation data indicating a relationship between an amount of change in the factor causing fluctuation in effective power and an optimum emitted power corresponding to the amount of the change, the compensation data being obtained by changing a factor causing fluctuation in effective power with respect to an optical disk for testing, and sequentially changing emitted power of the laser emitted from a laser source according to each factor causing fluctuation; and control means for adjusting emitted power based on the compensation data and a value detected by the detection means with respect to an optical disk to which data is recorded or from which data is reproduced, wherein the detection means detects an amount of shift, in an optical disk radial direction, of an objective lens that focuses a laser onto an active layer of the optical disk.

9. A method for adjusting laser power in an optical disk apparatus in which an active layer of an optical disk is irradiated with a laser, the method comprising:

a first step of acquiring and storing at a storage means compensation data indicating a relationship between an amount of a change in a factor causing fluctuation in an effective laser power which is the laser power at the active layer of the optical disk and an optimum emitted power corresponding to the amount of the change, by changing the factor causing a fluctuation in effective power with respect to an optical disk for testing, and sequentially changing the emitted power of the laser emitted from a laser source according to each change in the factor causing fluctuation;

a second step of obtaining an optimum emitted power by sequentially changing emitted power with respect to the optical disk to which data is recorded or from which data is reproduced, and acquiring as a compensation correction value the obtained optimum emitted power Pwo and an amount of change S1 in a factor causing fluctuation in effective power with respect to the optimum emitted power Pwo; and a third step of detecting an amount of change in a factor causing a fluctuation in effective power, at a time of recording or reproduction, and adjusting emitted power based the detected amount, the compensation data and the correction value, wherein:

when the optimum emitted power Pwo acquired as a compensation correction value is referred to as Pwo, an optimum emitted power P1 which is obtained based on the correction data and corresponds to the amount of change S1 in a factor causing fluctuation in effective power is referred to as P1, and an optimum emitted power P2 which is obtained based on the correction data and corresponds to the amount of change S2 in a factor causing fluctuation detected from the detection means is referred to as P2, then the control means adjusts the emitted power P at a time of recording or reproduction so as to be Pwo×P2/P1.

* * * * *